T. L. & T. J. STURTEVANT.
INTERNAL COMBUSTION ENGINE.
APPLICATION FILED AUG. 5, 1915.
1,185,951.
Patented June 6, 1916.
4 SHEETS—SHEET 1.
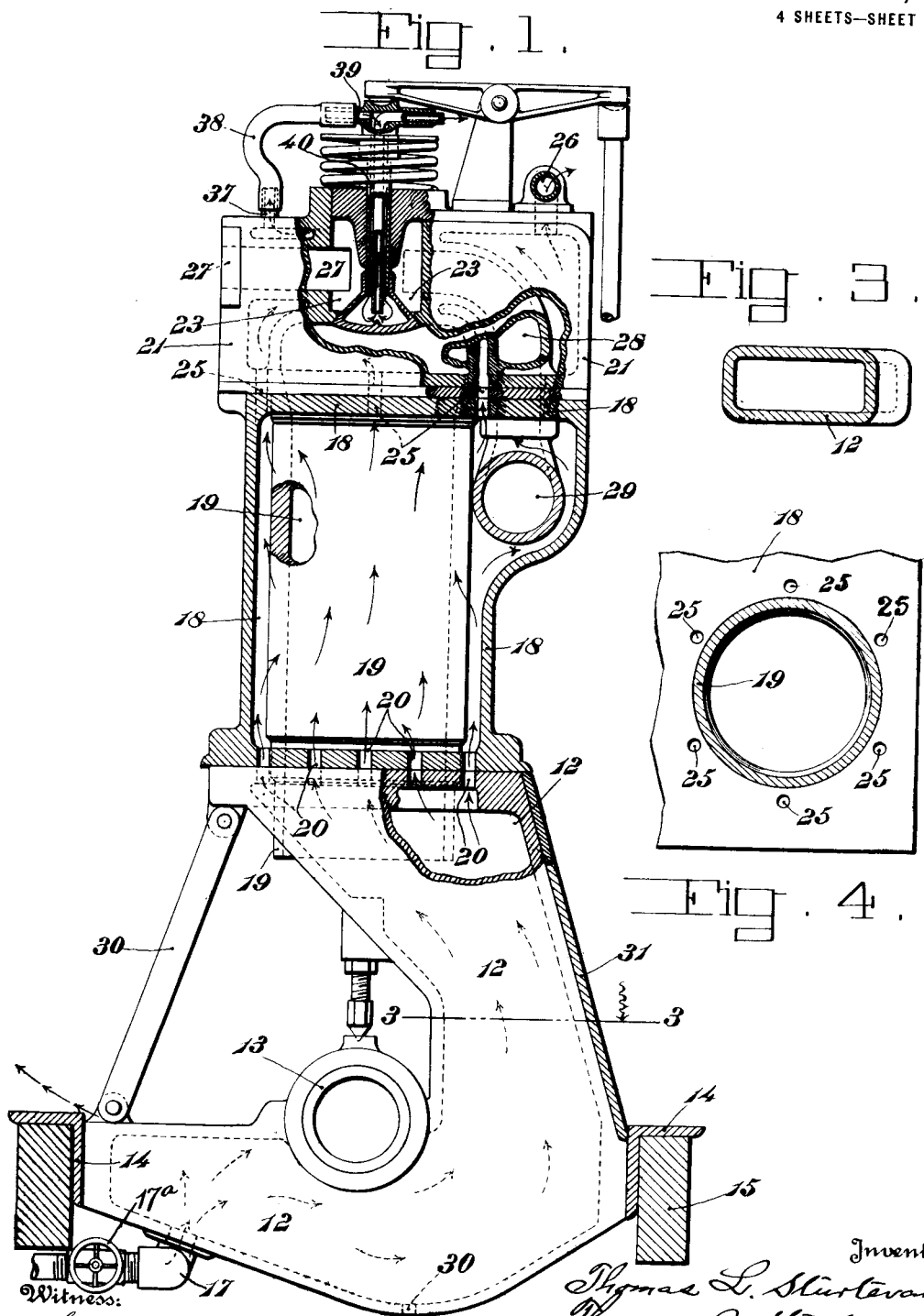

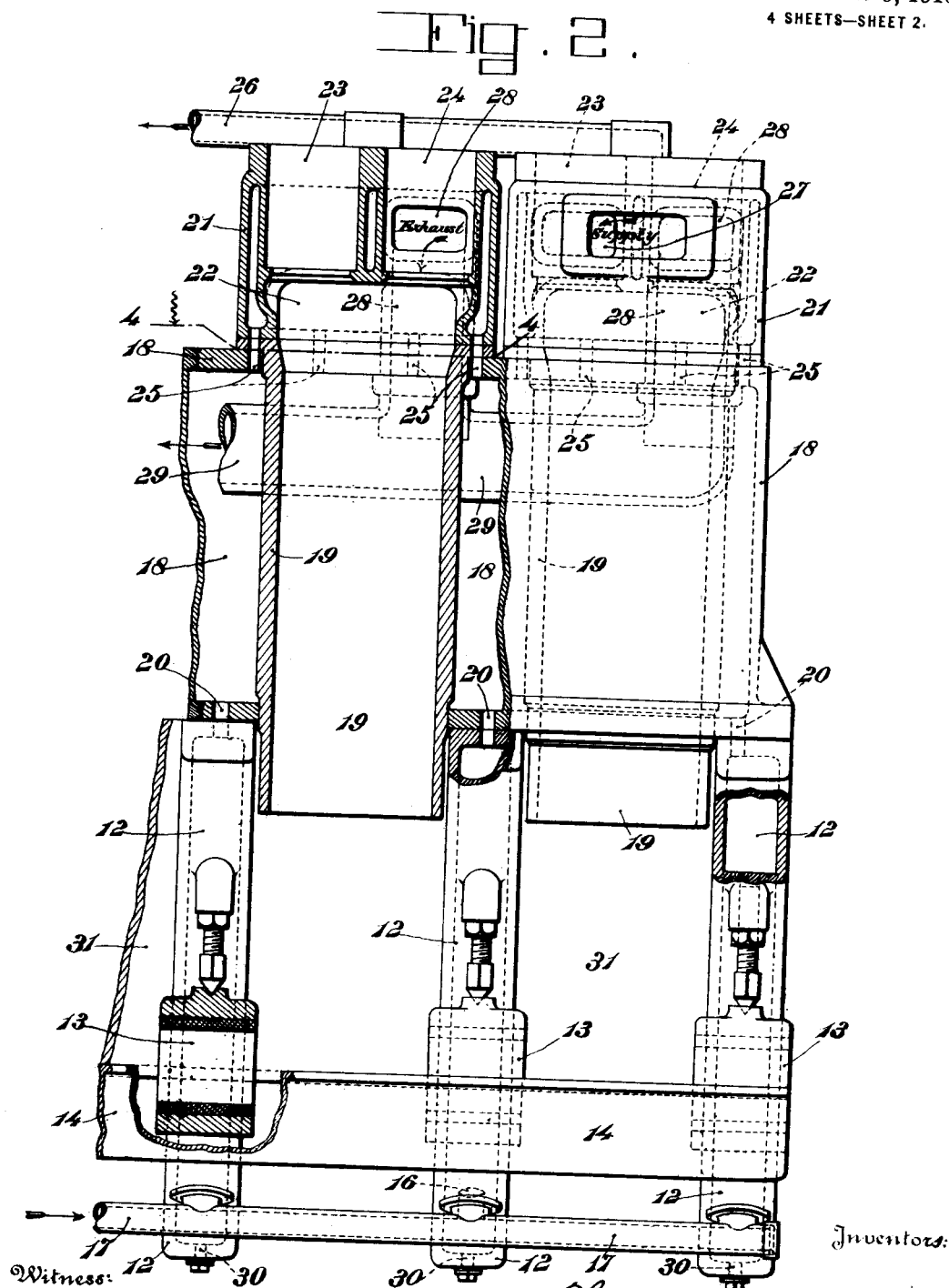

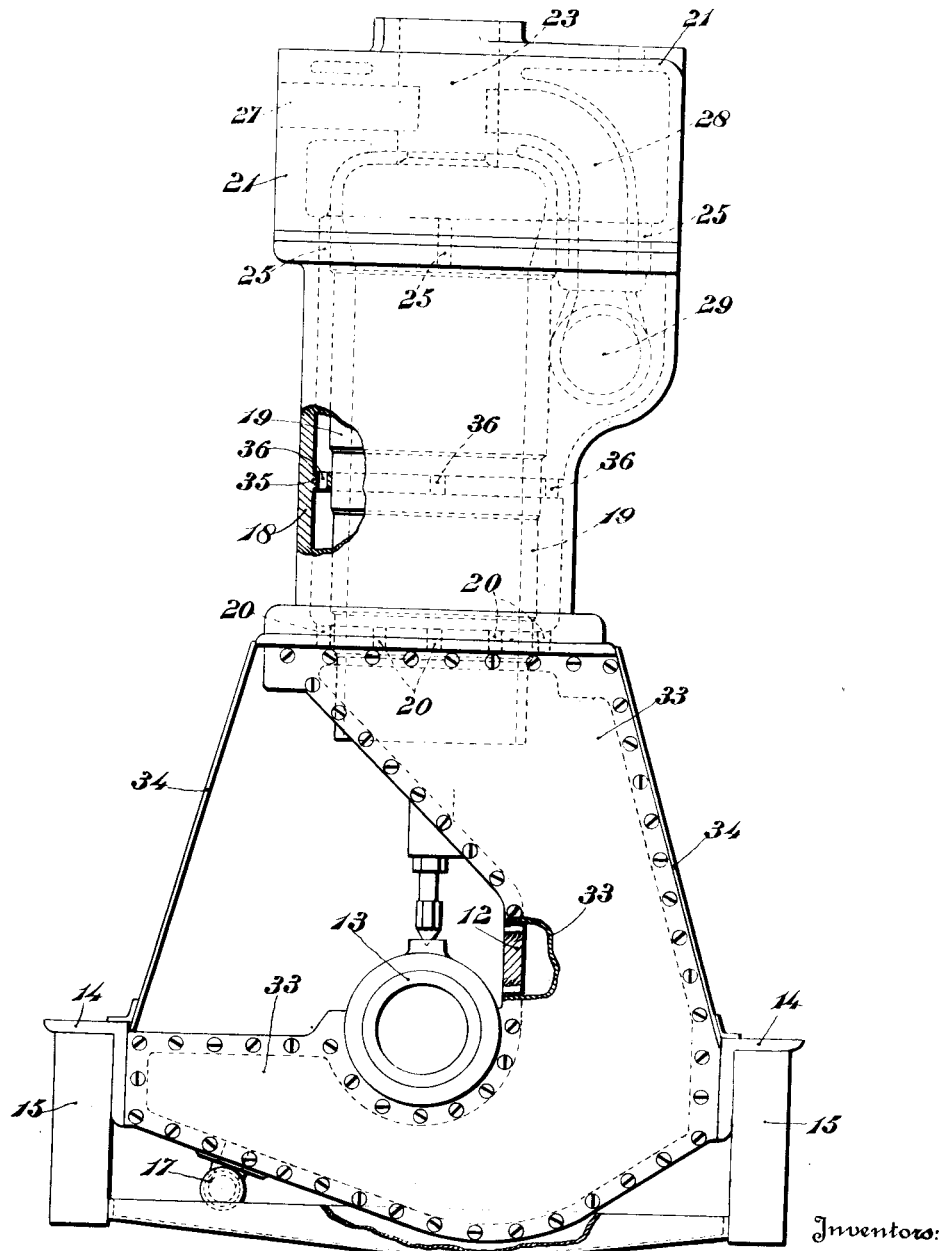

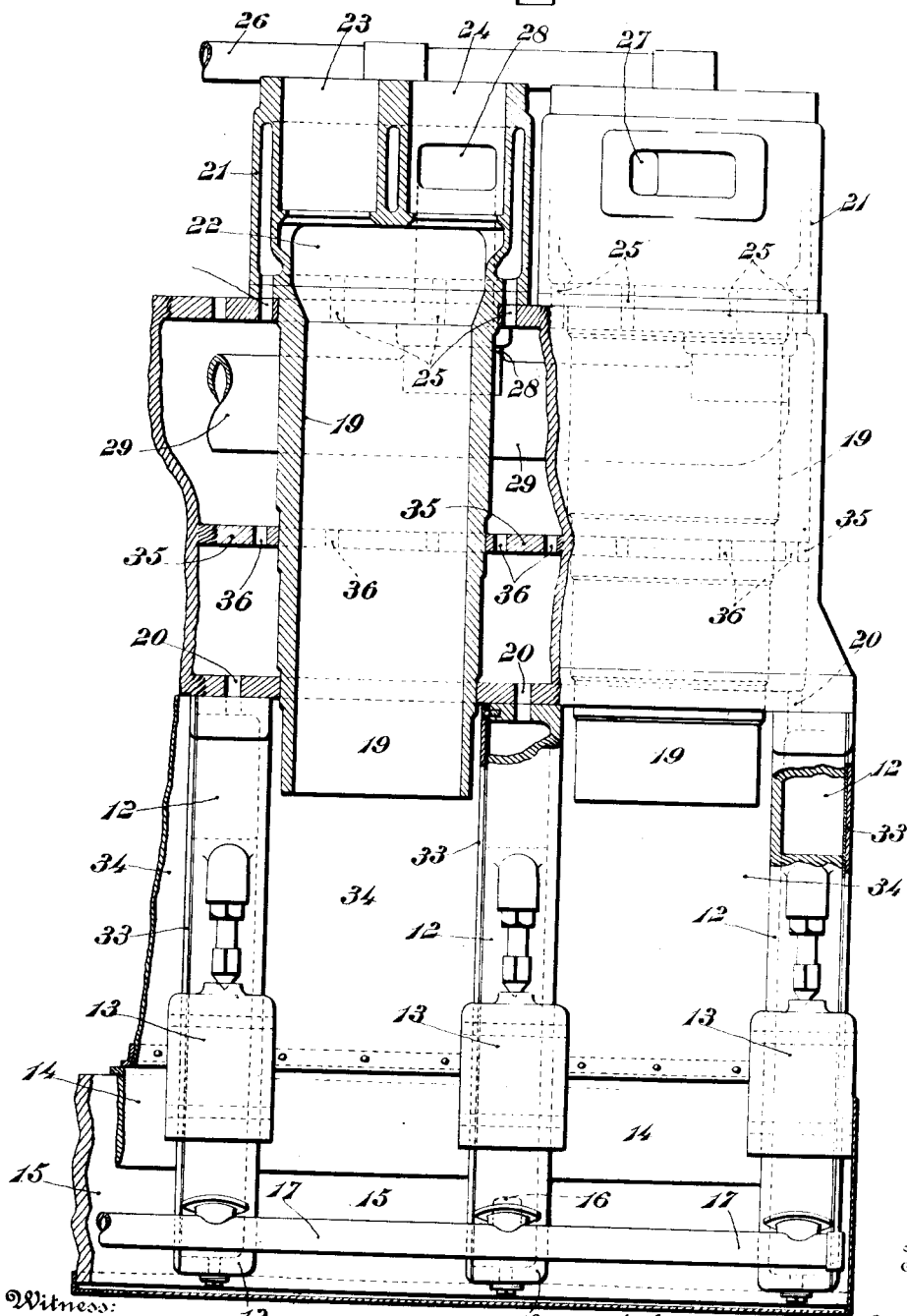

UNITED STATES PATENT OFFICE.

THOMAS LEGGETT STURTEVANT, OF QUINCY, AND THOMAS JOSEPH STURTEVANT, OF WELLESLEY, MASSACHUSETTS, ASSIGNORS TO STURTEVANT MILL COMPANY, A CORPORATION OF MAINE.

INTERNAL-COMBUSTION ENGINE.

1,185,951.  Specification of Letters Patent.  Patented June 6, 1916.

Application filed August 5, 1915. Serial No. 43,734.

*To all whom it may concern:*

Be it known that we, THOMAS L. STURTEVANT and THOMAS J. STURTEVANT, citizens of the United States, residing, respectively, at Quincy and Wellesley, in the county of Norfolk and State of Massachusetts, have invented or discovered certain new and useful Improvements in Internal-Combustion Engines, of which the following is a specification, reference being had therein to the accompanying drawings.

This invention relates to internal combustion engines and more particularly to that class intended for use as marine engines, although, as will be understood, the invention is adapted for use in connection with other engines than marine engines.

The invention relates more particularly to a water cooling system whereby cool water may be introduced into the bottom part of the engine, be circulated upward through hollow parts of the engine frame, and then be discharged from near the top of the engine, this being preferably effected by providing hollow mountings for the crank shaft, so that the bearings for said crank shaft will be properly cooled, the water, in a properly regulated quantity, being forced from the hollow crank shaft mountings upward into and through a water box, in which the engine cylinders are immersed, and thence into and through the jacketed heads of the engine cylinders, and out through a discharge pipe located at or near the tops of the cylinder heads. By thus introducing the cooling water into the crank shaft mountings at the bottom of the engine and forcing it progressively upward, as just described, the crank shaft bearings will be kept properly cooled, and the cooling water will become progressively heated as it passes upward through the engine, so that, while properly cooling all the engine parts, the water will be so regulated in quantity that the combustion chambers of the cylinders and the jacketed heads in which said chambers are preferably located will not be too much cooled so as to interfere with proper combustion of the hydrocarbon fuel from which power is derived, and proper expansion of the gases resulting from such combustion.

In the accompanying drawings Figure 1 is an end view, partly in vertical section, of one form of engine embodying the present invention, and Fig. 2 is a partial side view, also partly in vertical section, of the same. Fig. 3 is a detail section on line 3—3, Fig. 1. Fig. 4 is a detail section on line 4—4, Fig. 2. Fig. 5 is an end view, and Fig. 6 a partial side view, of an engine embodying a slightly different form of the invention from that shown in Figs. 1 and 2.

Referring to the drawings, 12 denotes hollow crank shaft mountings of hook-like form so as to afford open sides for the convenient introduction of a crank shaft to the bearings 13 afforded by the said mountings. Attached to or formed integral with the mountings 12 are angle bars 14 by means of which the engine may be supported on beams 15, or otherwise. Each of the mountings 12 is provided with an inlet 16 communicating with a manifold water inlet pipe 17 which will be connected with a suitable force pump so that water under pressure may be forced into and through the hollow mountings 12.

The quantity of water entering the pipe 17 may be regulated by the cock or valve 17ª, to govern the speed of the circulating flow, as cooling conditions may require. This cock or valve, which we term a "subtraction valve", is placed between the manifold and the pump to provide means for subtracting cooling water from the forced water supply, and thus prevent excessive cooling.

Supported on the mountings 12 is a water box 18 through which the engine cylinders 19 extend, said cylinders being pressed or shrunk into said water box so as to form tight joints. Each of the hollow crank shaft mountings 12 communicates with the chamber of the water box through a series of openings 20 so that water may stream upward under pressure through said openings into and through said water box. The jacketed cylinder heads 21, which, in the construction herein shown, are each formed with combustion chamber 22 and with inlet and exhaust valve chambers 23 and 24, are secured to the top of the water box, each of said cylinder heads communicating with the said water box by a circular series of passages 25 so that water may flow freely from said water box into and through said jacketed cylinder heads and finally find its exit through a water discharge pipe 26 located at or near the tops of said cylinder heads and communicating with the water-jacket chambers of same. Each of the cylinder heads is provided with an inlet port 27 and an exhaust port or passage 28, the said exhaust ports or passages 28 communicating with an exhaust pipe 29 submerged in the upper part of the water box 18. Each of the hollow crank shaft mountings is provided at the lowest point of its curved bottom with a drain opening 30 closed by a suitable plug.

In the form of the invention shown in Figs. 1 and 2 each of the crank shaft mountings 12 consists of an integral casting, a section of which is shown in Fig. 3, the said mountings being preferably braced by a heavy steel plate 31 which may be bolted to the bed frame or otherwise secured in place so as to brace and steady these parts. Also for large engines the open sides of the crank shaft mountings 12 may be closed by hinged bracing bars 32 the lower ends of which may be made to unfasten and swing upward, as denoted by the arrow in Fig. 1, when the crank shaft is to be placed into or removed from its bearings in the said mountings.

In the form of the invention shown in Figs. 5 and 6 each of the crank shaft mountings 12 is cast as an open sided box closed by a steel plate 33 suitably attached to the mounting and beneath the edges of which, if necessary, packing strips may be placed to insure tight joints. Also, if desired, steel cover plates 34 may be attached to the mountings 12, thereby steadying or bracing the same and forming a housing for the crank shaft.

For very large engines it will be preferred to form the water box with a horizontal strengthening partition 35, which will be provided, around each cylinder 19, with a circular series of openings 36, similar to the circular series of openings 25, to afford passages from the lower to the upper part of the chamber of the water box.

Each of the cylinder heads preferably communicates, through a pipe 37 and a flexible tube 38, with a hollow head 39 on a valve stem 40 of a water cooled valve preferably constructed as fully shown and described in the application of Thomas L. Sturtevant filed May 21, 1914, Serial No. 840,072, so that the valves, as well as the other parts of the engine, will be properly cooled.

From the foregoing it will be understood that the improved construction provides means whereby cold water under pressure may be introduced into the bottom of the engine through the hollow crank shaft mountings or carriers, so as to keep the bearings in the crank shaft properly cooled, and will be streamed upward under pressure from the said mountings or carriers into and through the water box in which the engine cylinders are immersed, to and through the cylinder heads mounted above the engine cylinders, so that the water will become progressively hotter as it flows upward through the engine; and while it will properly cool all of the engine parts it will be sufficiently warmed by the time it passes by the combustion chamber portions of the engine cylinders so that it will not unduly cool the same and thus interfere with proper combustion of the hydrocarbon fuel introduced into the said chambers, and the proper expansion of the gases resulting from such combustion.

It will also be understood that the construction hereinbefore described enables the cooling water to be circulated upward through and entirely within the engine frame, without outside connections, thus affording a neat and compact water-cooled engine construction. In this connection it will be noted that the hollow engine frame parts, through which the cooling water is forced, comprise the hollow crank shaft mountings 12, the water box 18 with the chamber of which said hollow mountings directly communicate by means of the openings 20, and the jacketed or hollow cylinder heads communicating directly with the chamber of the said water box through the openings or passages 25.

By reference to the drawings it will be seen that the lower parts of the engine cylinders 19 extend down below the water box 18 between and closely adjacent to the hollow water-cooled crank-shaft mountings 12, so that the lower parts of said cylinders, the pistons working therein and some of the gases following the pistons will be cooled by the absorption of heat by the cool crank shaft mountings into which the cold water first enters, so that the said mountings will necessarily be kept cool.

The invention therefore provides a marine engine which will have the greatest possible compactness and efficiency in that all parts of the engine will be cooled in a manner which is most desirable.

Having thus described our invention we claim and desire to secure by Letters Patent:—

1. An internal combustion engine having hollow frame parts, comprising jacketed cylinder heads, means whereby water may be introduced into the lower part of said frame and may be forced upward through and entirely within said hollow parts and be discharged from said cylinder heads near the top of the engine, so that the water will become progressively heated as it circulates upward through the engine.

2. An internal combustion engine having hollow frame parts, including hollow mountings affording crank shaft bearings at the lower part of the engine, and jacketed cylinder heads, means whereby water may be introduced into said mountings adjacent said crank shaft bearings and may be forced upward through and entirely within said frame, and be discharged from said cylinder heads near the top of the engine, so that the water will become progressively heated as it circulates upward through the engine.

3. An internal combustion engine having hollow frame parts, including jacketed cylinder heads, a plurality of vertical cylinders surrounded by said heads, crank-shaft bearings at the lower part of the frame, means whereby water may be introduced into the lower part of said frame, adjacent said crank shaft bearings, and may be forced upward through and entirely within said frame, and be discharged from said cylinder heads near the top of the engine, so that the water will become progressively heated as it circulates upward through the engine.

4. A multiple cylinder internal combustion engine, comprising hollow crank shaft mountings at the base of the engine, a cylinder water box supported by said mountings and having a chamber surrounding the engine cylinders, the chambers of said mountings communicating directly with the chamber of said water-box by suitable passages, means for introducing water into said mountings, jacketed cylinder heads disposed above said water-box and communicating with the chamber of the latter by suitable passages, whereby water may be circulated upward from said mountings through said water-box and said cylinder heads, and means whereby the cooling water may be discharged from said cylinder heads.

5. A multiple cylinder internal combustion engine comprising hollow crank shaft mountings at the base of the engine, means for introducing water into said mountings, and means whereby water may be circulated upward from said mountings entirely through the engine frame and may finally be discharged from near the top thereof, said water-circulating means comprising a water box supported by said mountings and the chamber of which surrounds the engine cylinders, and cylinder heads surmounting said cylinders, direct communicating passages, within the engine frame, being provided between said mountings and said water box, and between the latter and said cylinder heads.

6. In a multiple cylinder internal combustion engine, the combination with hollow crank shaft mountings, of a water box above the said mountings, and the chamber of which water box communicates directly with the chambers of said mountings by suitable passages within the engine frame, jacketed cylinder heads arranged above the said water box and communicating with said water box by suitable passages within the engine frame, an inlet pipe by which cool water may be introduced into the lower parts of said crank shaft mountings, and a water discharge pipe communicating with the said jacketed cylinder heads and through which the water forced through the engine may be discharged.

7. In a multiple cylinder internal combustion engine, the combination with hollow crank shaft mountings, of a water box above the said mountings the chamber of said water box communicating directly with the chambers of said mountings by suitable passages within the engine frame, jacketed cylinder heads disposed above the said water box and communicating with said water box by suitable passages, an inlet pipe by which cool water may be introduced into said crank shaft mountings, a water discharge pipe communicating with the said jacketed cylinder heads and through which the water forced through the engine may be discharged, and an exhaust pipe communicating with said cylinder heads and passing through said water-box.

8. An internal combustion engine having a plurality of vertical cylinders and having also crank shaft bearings at its lower part, the engine frame being provided with means whereby water may be introduced into the base of the engine adjacent said crank shaft bearings and may be forced upward through said frame, entirely within the same, and be discharged from the top of the engine, so that the water will become progressively heated as it circulates upward through the engine, and water-cooled valves through which the water is also forced from the upper part of the engine frame.

9. A multiple cylinder internal combustion engine comprising hollow crank shaft mountings at the base of the engine, and hollow frame members, comprising jacketed cylinder heads, above said mountings, means for introducing water into said mountings so that the water may be circulated upward from said mountings through and entirely within the hollow frame, and may finally be discharged from said cylinder heads, and water-cooled valves through which the water is also forced from said hollow frame.

10. An internal combustion engine provided with hollow frame parts, comprising jacketed cylinder heads, through which cooling water may be forced, entirely within the engine frame, from the lower part of the frame upward, for cooling the parts progressively from bottom to top, combined with water-cooled valves, and water connections between said valves and the said cylinder heads.

11. An internal combustion engine having hollow frame parts through which cooling water may be circulated through and entirely within the engine frame from the lower part of said frame upward, to cool the parts progressively from bottom to top, and means for regulating the forced supply of cooling water.

12. A hollow crank shaft mounting, for an internal combustion engine, having a water space adjacent the crank-shaft bearing, said hollow mounting having an open side, combined with a plate secured to said mounting and serving to close said open side.

13. In a multiple cylinder internal combustion engine, a plurality of hollow crank shaft mountings of hook form open at their front sides, in combination with a cylinder-carrying water box in which parts of all the cylinders are submerged, and means for forcing cooling water through said hollow crank shaft mountings into said water box, and means for regulating the quantity so forced.

14. In a multiple cylinder internal combustion engine, the combination with a water box carrying submerged cylinder parts, and, on the top of said water box, jacketed cylinder heads, said box having secured thereto hollow crank shaft carriers, means for forcing cooling water through said hollow crankshaft carriers into said box in a plurality of streams and causing the water to pass from said box into each of said jacketed cylinder heads by a plurality of streams, and to exit from near the top of each jacketed head, and means for regulating the velocity of the streams of cooling water.

15. In an internal combustion engine, the combination with a plurality of hollow crank shaft mountings, of a plurality of cylinders, a water box supported by said mountings and common to all of said cylinders, and in which water box said cylinders are immersed, the chambers of said mountings communicating directly with the chamber of said water-box by a plurality of passages extending from the tops of said mountings into the bottom of said water box, jacketed cylinder heads surmounting said water box and each directly communicating with the chamber of said water box by a plurality of water passages, means for admitting cooling water to the said crank shaft mountings, and means for discharging water from said cylinder heads; whereby water introduced into the said crank shaft mountings may be circulated upward entirely within the engine frame, becoming progressively warmer as it ascends, and may finally be discharged from the upper part of the engine frame.

16. In an internal combustion engine, the combination with a plurality of hollow crank shaft mountings, of a plurality of cylinders, a water box supported by said mountings and common to all of said cylinders, and in which water box said cylinders are immersed, the chambers of said mountings communicating directly with the chamber of said water box by a plurality of passages extending from the tops of said mountings into the bottom of said water box, jacketed cylinder heads surmounting said water box and each directly communicating with the chamber of said water box by a plurality of water passages, means for admitting cooling water to the said crank shaft mountings, means for discharging water from said cylinder heads and means for regulating the speed of flow of the cooling water; whereby water introduced into the said crank shaft mountings may be circulated upward entirely within the engine frame in a properly regulated quantity, becoming progressively warmer as it ascends, and may finally be discharged from the upper part of the engine frame.

17. In an internal combustion engine, the combination with hollow crank-shaft mountings adapted to be water cooled, of engine cylinders mainly above said mountings but extending partly down between and adjacent to said mountings, so that their lower parts will be cooled by the absorption of heat by the cool mountings.

18. In an internal combustion engine, the combination with hollow crank-shaft mountings adapted to be water cooled, of a water box above said mountings, engine cylinders mounted in said water box and mainly surrounded by the chamber thereof but having lower parts extending down between and adjacent to said mountings.

In testimony whereof we affix our signatures.

THOMAS LEGGETT STURTEVANT.
THOMAS JOSEPH STURTEVANT.

Copies of this patent may be obtained for five cents each, by addressing the "Commissioner of Patents, Washington, D. C."